United States Patent
Benson

(10) Patent No.: US 10,141,723 B2
(45) Date of Patent: Nov. 27, 2018

(54) LOADCENTERS WITH IMPROVED BACKPAN TO BACK WALL ASSEMBLY FASTENERS ALLOWING ONE DIRECTION ASSEMBLY AND RELATED ENCLOSURES AND METHODS

(71) Applicant: Eaton Intelligent Power Limited, Dublin (IE)

(72) Inventor: Tony Ray Benson, Monticello, IL (US)

(73) Assignee: Eaton Intelligent Power Limited, Dublin (IE)

(*) Notice: Subject to any disclaimer, the term of this patent is extended or adjusted under 35 U.S.C. 154(b) by 0 days.

(21) Appl. No.: 15/467,870

(22) Filed: Mar. 23, 2017

(65) Prior Publication Data

US 2018/0278030 A1 Sep. 27, 2018

(51) Int. Cl.
| | | |
|---|---|---|
| *H02B 1/04* | (2006.01) | |
| *H02B 1/30* | (2006.01) | |
| *H02B 1/20* | (2006.01) | |
| *H02B 3/00* | (2006.01) | |

(52) U.S. Cl.
CPC ............... *H02B 1/30* (2013.01); *H02B 1/04* (2013.01); *H02B 1/20* (2013.01); *H02B 3/00* (2013.01)

(58) Field of Classification Search
USPC .......................................................... 174/660
See application file for complete search history.

(56) References Cited

U.S. PATENT DOCUMENTS

| | | | | | |
|---|---|---|---|---|---|
| 2,871,284 | A | * | 1/1959 | Wills | H02B 1/42 174/535 |
| 2,934,660 | A | * | 4/1960 | Brunner | H02B 1/056 174/84 R |
| 3,315,556 | A | * | 4/1967 | Speck | F16B 5/02 174/66 |
| 3,767,977 | A | * | 10/1973 | Bachman | H02B 1/056 174/72 B |
| 4,024,441 | A | * | 5/1977 | Coyle | H02B 1/21 174/129 B |
| 4,166,934 | A | * | 9/1979 | Marrero | H01H 9/02 174/55 |
| 5,072,071 | A | * | 12/1991 | Cassity | H02B 1/056 174/135 |
| D324,816 | S | | 3/1992 | LeDuc | |

(Continued)

OTHER PUBLICATIONS

Photographs of Prior Art Products—"GE loadcenter showing a two direction assembly into the enclosure and then a slide to the final position" (1 page) (date unknown, but prior to filing date of the present application).

(Continued)

*Primary Examiner* — William H Mayo, III
*Assistant Examiner* — Krystal Robinson
(74) *Attorney, Agent, or Firm* — Myers Bigel, P.A.

(57) ABSTRACT

Loadcenters with an enclosure having an interior compartment and a back wall that include at least one lance, typically a plurality of longitudinally spaced apart lances that project inwardly toward a front of the enclosure. Each lance comprises an aperture. The loadcenters also include a back pan assembly in the interior compartment. The back pan assembly has at least one latch, typically plurality of longitudinally spaced apart latches, each latch with a legs that extend through the aperture of the aligned lance to attach the back pan assembly to the backwall.

21 Claims, 15 Drawing Sheets

(56) References Cited

U.S. PATENT DOCUMENTS

| | | | |
|---|---|---|---|
| 5,213,518 A * | 5/1993 | Weidler | H01R 13/6315 |
| | | | 439/211 |
| 5,272,592 A * | 12/1993 | Harris | H02B 1/20 |
| | | | 361/637 |
| 5,307,243 A * | 4/1994 | Sharp | H02B 1/202 |
| | | | 174/153 G |
| D370,463 S | 6/1996 | Nagele et al. | |
| 5,696,664 A * | 12/1997 | Rose | H02B 1/056 |
| | | | 174/166 R |
| D410,437 S | 6/1999 | Mowery | |
| D419,966 S | 2/2000 | Mowery | |
| 7,485,817 B2 | 2/2009 | Gottschalk | |
| 7,968,794 B1 | 6/2011 | Baldwin | |
| 8,729,988 B1 * | 5/2014 | Maloney | H01H 69/01 |
| | | | 335/205 |
| 9,112,336 B2 * | 8/2015 | Samuelson | H02B 1/056 |
| D742,340 S | 11/2015 | Krivonak et al. | |
| D760,230 S | 6/2016 | Iizuka et al. | |
| D767,514 S | 9/2016 | Summers et al. | |
| D767,571 S | 9/2016 | Iizuka et al. | |
| 9,462,731 B2 | 10/2016 | Onishi et al. | |
| D798,813 S | 10/2017 | Marinelli et al. | |
| D814,420 S | 4/2018 | Chen | |
| D816,049 S | 4/2018 | Kim | |
| 10,000,956 B2 | 6/2018 | Whitaker et al. | |
| 2002/0182896 A1 * | 12/2002 | Welsh | H05K 7/1409 |
| | | | 439/1 |
| 2009/0302724 A1 * | 12/2009 | Allard | F25D 17/042 |
| | | | 312/237 |
| 2011/0149483 A1 * | 6/2011 | Diaz | H02B 1/056 |
| | | | 361/637 |
| 2013/0241359 A1 | 9/2013 | Naito et al. | |
| 2014/0185195 A1 | 7/2014 | Samuelson | |
| 2015/0155849 A1 | 6/2015 | Kikuchi | |

OTHER PUBLICATIONS

Photographs of Prior Art Products—"Siemens loadcenter showing a two direction assembly into the enclosure and then a slide to the final position" (1 page) (date unknown, but prior to filing date of the present application).

Photographs of Prior Art Products—"Square D loadcenter showing a two direction assembly into to the enclosure and then a slide to the final position" (1 page) (date unknown, but prior to filing date of the present application).

* cited by examiner

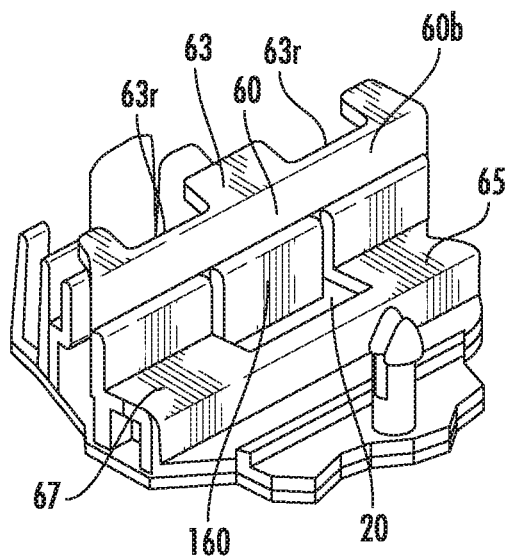 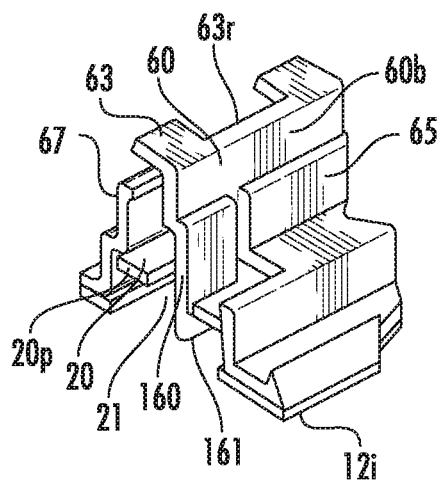
FIG. 12A  FIG. 12B
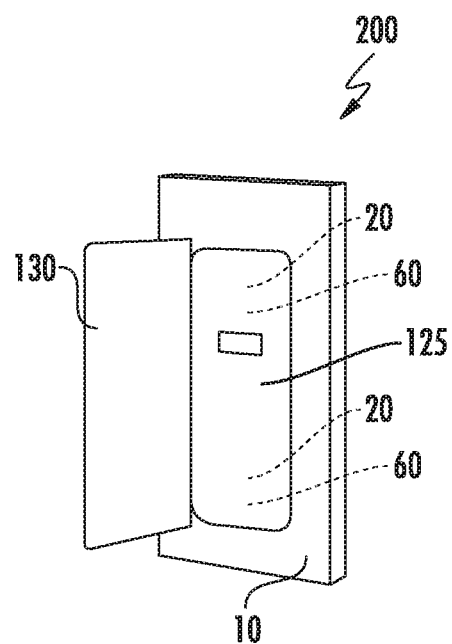
FIG. 13

US 10,141,723 B2

LOADCENTERS WITH IMPROVED BACKPAN TO BACK WALL ASSEMBLY FASTENERS ALLOWING ONE DIRECTION ASSEMBLY AND RELATED ENCLOSURES AND METHODS

FIELD OF THE INVENTION

The present disclosure relates to distribution load centers.

BACKGROUND OF THE INVENTION

Electrical loadcenters are well known. Electrical loadcenters include electrical busses that comprise conductors permitting electrical current to be carried throughout the electrical load center. Electrical busses may contain features permitting attachment of fuses, relays, switches, wires, breakers, and other electrical elements. Loadcenters may contain one or more electrical busses in close proximity to one another, and insulating material or insulation may be used to avoid an arcing or shorting event occurring between the busses. Busses are electrically insulated from each other to avoid a phase-to-phase short circuit. Busses are also electrically insulated from the electrical load center enclosure to avoid a phase-to-ground short circuit. Some loadcenters also include branch circuit breakers connected to the electrical busses at specific points within the load centers. The location, orientation, and spacing of the bus elements and insulation elements within the load are arranged so as to prevent an arcing, overcurrent, or short circuit event once the busses are placed under load. The loadcenters typically include a backpan assembly with a backpan holding a bus structure attached to the back of the enclosure. See, e.g., U.S. Pat. No. 9,112,336, the contents of which are hereby incorporated by reference as if recited in full herein.

Known conventional loadcenters with backpan assemblies locate and hold the backpan to the back of the enclosure with a two direction motion to assemble which can complicate the assembly process for both mechanical function and fastening and can result in increased assembly time and cost.

SUMMARY OF EMBODIMENTS OF THE INVENTION

Embodiments of the present invention provide backpan to case (enclosure back wall) fasteners that allow decreased assembly time for mounting the backpan assembly to the back of the enclosure.

Embodiments of the invention are directed to loadcenters that include an enclosure having an interior compartment and a back wall. The back wall has at least one lance that projects inwardly toward a front of the enclosure. The at least one lance has an aperture. The enclosure also has a back pan assembly in the interior compartment. The back pan assembly has at least one latch and the at least one latch has a rearwardly extending leg. The leg extends through a corresponding aperture of an aligned lance to attach the back pan assembly to the back wall.

The at least one lance can be a plurality of longitudinally and/or laterally spaced apart lances and the at least one latch is a plurality of longitudinally and/or laterally spaced apart latches.

Embodiments of the invention are directed to loadcenters that include an enclosure having an interior compartment and a back wall. The back wall has a plurality of longitudinally spaced apart lances that project inwardly toward a front of the enclosure. Each lance has an aperture. The loadcenters also include a back pan assembly in the interior compartment. The back pan assembly has a plurality of longitudinally spaced apart latches, each latch with a rearwardly extending leg. Each leg extends through a corresponding aperture of an aligned one of the lances to attach the back pan assembly to the backwall.

The plurality of spaced apart lances can include at least three lances on a right side of the back wall and at least three on a left side of the back wall.

The plurality of spaced apart lances can be provided as a first plurality of lances longitudinally aligned on a right side of the enclosure and a second plurality of lances longitudinally aligned on a left side of the enclosure. Pairs of the first plurality and the second plurality of lances can be laterally aligned. The plurality of spaced apart latches can be provided as a first plurality of latches longitudinally aligned on a right side of a rear of the back pan assembly and a second plurality of latches longitudinally aligned on a left side of the rear of the back pan assembly. Pairs of the first plurality and the second plurality of latches can also be laterally aligned.

The back wall can have a rear outer facing surface with inwardly extending cavities behind the lances.

The lances can have a rectangular inner facing projection with longitudinally spaced apart upper and lower end portions that taper in a longitudinal direction toward an inner surface of the back wall.

The apertures can be rectangular.

The apertures can be elongate and extend in a lateral or longitudinal direction.

The legs of the latches can include an elongate lip. The elongate lip can extends through an aligned one of the apertures to engage a surface of a wall about one side of the aligned one of the apertures.

The leg of the latch can have an elongate lip that engages a wall of an aligned one of the lances on one side of the aperture. The latches can have a latch body with first and second segments that extend laterally and longitudinally about the leg and reside against an inner surface of the back wall at locations adjacent but spaced apart from the lances.

The legs of the latches can have an elongate lip that extends in a longitudinal direction and engages a wall of the lance adjacent one side of the aperture.

The latches can have upper and lower longitudinally spaced apart and longitudinally extending angled ribs that slidingly receive longitudinally or laterally tapered spaced apart inwardly facing ends of the lances to help guide a cooperating latch and lance into proper position for locking engagement.

An innermost wall of the lances can provide the apertures to reside a distance in front of a primary surface of the back wall a distance that is between 0.1 inches and 1 inch.

The enclosure and the lances can be metallic. The latches can be electrically non-conductive or less electrically conductive than the enclosure or lances.

Other embodiments are directed to a metallic enclosure for an electrical apparatus, optionally a loadcenter. The enclosure includes a back wall with a plurality of lance projections that face inward, the projections having an innermost wall with apertures extending therethrough. A rear outer facing surface of the back wall has inwardly extending cavities behind the lance projections.

The plurality of spaced apart lances can include at least three lances on a right side of the back wall and at least three on a left side of the back wall.

The plurality of spaced apart lances can include a first plurality of lances longitudinally aligned on a right side of the enclosure and a second plurality of lances longitudinally aligned on a left side of the enclosure. Pairs of the first plurality and the second plurality of lances can be laterally aligned.

The lances can have a rectangular inner facing projection shape with longitudinally spaced apart upper and lower end portions that taper in a longitudinal direction toward an inner surface of the back wall.

The apertures can be rectangular.

The apertures can be elongate and extend in a lateral or longitudinal direction. The apertures can have a length dimension that is between 0.5 inches and 1 inch.

The enclosure and lances can be metallic.

An innermost wall of the lance projections can position the lance apertures a distance in front of a primary surface of the back wall a distance that is between 0.1 inches and 1 inch.

Other embodiments are directed to methods of installing a backpan assembly to a back wall of an enclosure. The methods can include: providing an enclosure with a back wall having at least one forwardly projecting lance; providing a backpan assembly with at least one latch; aligning the at least one latch with the at least one lance; and then pushing the backpan assembly straight inward with a single motion to lock the backpan assembly into position and attached to the backwall of the enclosure.

The at least one latch and the at least one lance are both a plurality of spaced apart lances and latches.

The latches and lances can be arranged as right and left side lance and latch pairs. An outer surface of the back wall of the enclosure can have cavities corresponding to the positions of the lances.

Other methods can include: providing an enclosure with a back wall having a plurality of forwardly projecting aligned sets of right and left side lances; providing a backpan assembly with a plurality of sets of left and right side latches; aligning the latches with lances; and then pushing the backpan assembly straight inward with a single motion to lock the backpan assembly into position and attached to the backwall of the enclosure.

An outer surface of the back wall of the enclosure can have inwardly facing cavities corresponding to the positions of the lances.

Optionally: (a) the lances can have through apertures that receive legs of the latches and engage lips that extend perpendicular to the legs and parallel to a wall of the lance; and/or (b) the lances can be elongate with elongate apertures and the lips extend in a longitudinal and/or a lateral direction under the projecting surface of the lances.

Further features, advantages and details of the present invention will be appreciated by those of ordinary skill in the art from a reading of the figures and the detailed description of the preferred embodiments that follow, such description being merely illustrative of the present invention.

It is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

BRIEF DESCRIPTION OF THE DRAWINGS

FIG. 12A is a partial front, side perspective view of a backpan latch and cooperating case lance according to embodiments of the present invention.

FIG. 12B is a partial cutaway, front, side perspective view of the backpan latch and cooperating case lance according to embodiments of the present invention.

FIG. 13 is a front perspective view of an exemplary loadcenter according to embodiments of the present invention.

DETAILED DESCRIPTION OF EMBODIMENTS OF THE INVENTION

Figure 1:
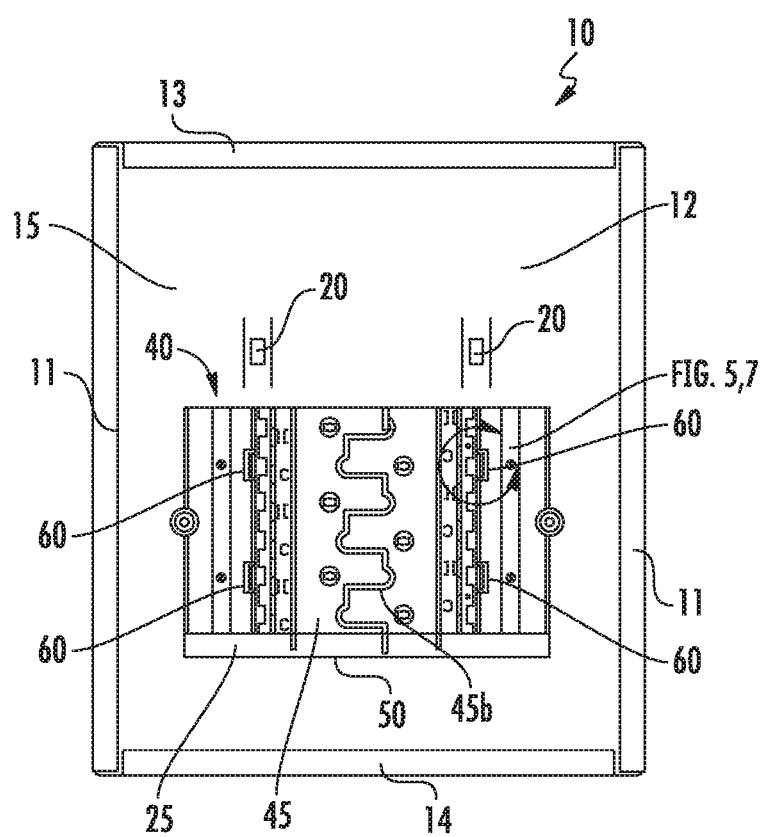
FIG. 1 is a front view of an exemplary enclosure (also referred to as a "case") of a load center with a back pan assembly according to embodiments of the present invention.

The present invention now will be described more fully hereinafter with reference to the accompanying drawings, in which illustrative embodiments of the invention are shown. Like numbers refer to like elements and different embodiments of like elements can be designated using a different number of superscript indicator apostrophes (e.g., 10, 10', 10'', 10'''). The terms "FIG." and "FIG." may be used interchangeably with the word "Figure" as abbreviations thereof in the specification and drawings. In the figures, certain layers, components or features may be exaggerated for clarity, and broken lines illustrate optional features or operations unless specified otherwise.

In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

The term "about" refers to numbers in a range of +/−20% of the noted value.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

Embodiments of the invention are particularly suitable for electrical devices such as load centers. The terms "loadcenter" and "electrical distribution load center" refer to the collective components of an electrical distribution system and its respective housing that supplies electrical power to one or more subsidiary circuits. The terms "bus," "bus element," "electrical distribution bus," or "bus bar" refers to components in an electrical distribution system that conducts electricity within the load center. However, the latch attachments and lances may also be useful for other devices such as devices comprising circuit breakers, for example.

Referring now to FIGS. 1 and 2, an exemplary enclosure 10 suitable for a load center is shown. The term "enclosure" is used interchangeably herein with the terms "case" and "housing". The enclosure 10 includes sidewalls 11, a top 13 and bottom 14 attached to a back wall 12 and providing an interior compartment 15.

Figure 10:
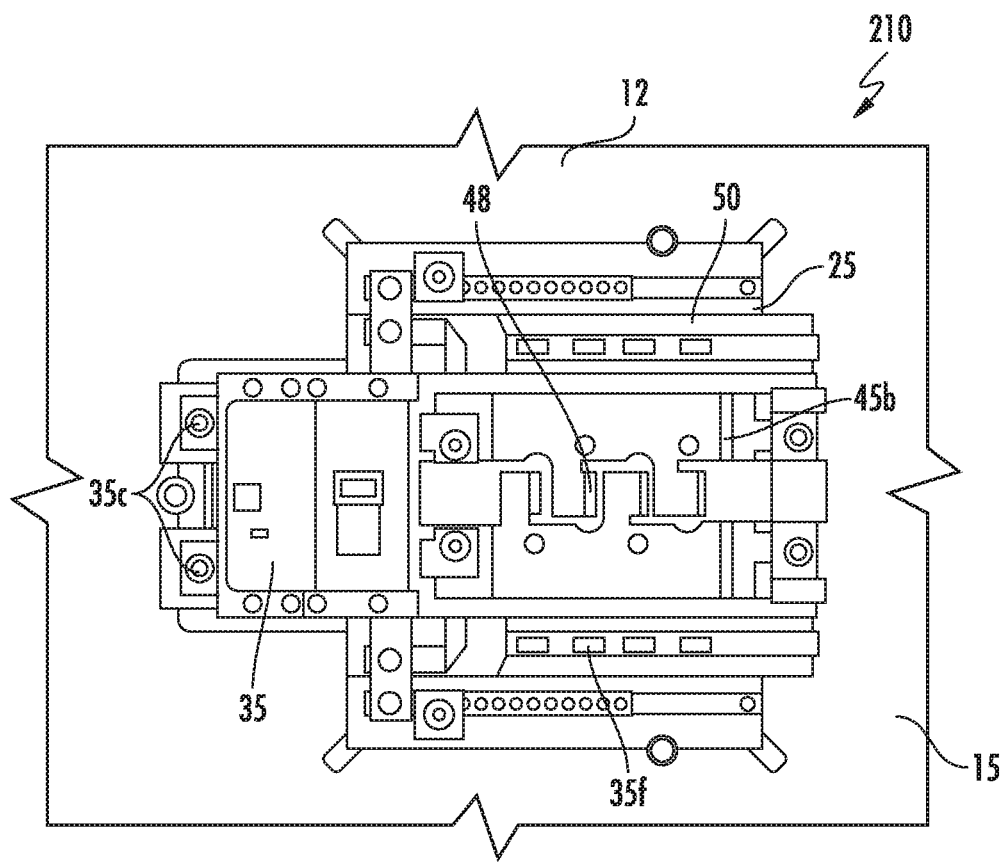
FIG. 10 is a top view of the enclosure with the assembled back pan assembly and a primary circuit breaker according to embodiments of the present invention.

As shown, the enclosure holds a backpan assembly 50, which includes a back pan 25 and an interior assembly 40 (sometimes referred to as an "interior"). The interior assembly 40 comprises a bus structure 45 with one or more bus bars 45b. The interior assembly 40 can be either detachably or permanently fastened to the back pan 25. The interior assembly 40 (also sometimes just referred to as "the interior") can refer to the internal components of the load center 10 including the insulating barrier, i.e., sheet, film or layer (which can optionally comprise mylar), the bus 45, the retaining clips (the hook part) and the stabs (the bent-up parts) and the like. The interior assembly 40 can include or be connected to a main breaker 35 (FIG. 10). The main breaker 35 may be connected to an external power supply via collars or lugs 35c that connect to cables/power cords that connect to an external power supply.

Referring to FIGS. 1 and 10, the one or more bus bars 45b may have substantially flat portions that extend longitudinally within, and lie in a plane parallel to a trough formed by the back pan 25. The bus bars 45b may contain stabs 48, such as branch circuit breaker stabs, that can be exposed within an insulation element so as to conduct electricity to branch circuit breakers when connected. The stabs 48 may extend upwardly to contact desired components such as a branch circuit breaker when connected.

The one or more bus bars 45b can be designed to electrically couple to the main breaker as well any branch circuit breakers. The one or more bus bars 45b can remain electrically insulated from other electrically conducting elements thus avoiding the occurrence of a shorting event.

The backpan assembly 50 and/or the interior assembly 40 may comprise either electrically conducting or electrically insulating (i.e., non-electrically conducting) material adjacent the back pan 25. In some embodiments, an electrically insulating barrier such as a polyester sheet or film which may comprise a mylar or BoPET (biaxially-oriented polyethylene terephthalate) sheet or film, may be provided under and/or on the substantially flat surfaces of the bus bars 45b to electrically insulate the one or more bus bars 45b from other conducting elements, such as the back pan 25, if the back pan 25 is made of a conductive material such as metal.

In some embodiments, the one or more bus bars 45b can maintain electrical insulation from other conducting elements based only on physical separation from the other conducting elements without requiring electrically insulating material.

In some embodiments, if the back pan 25 comprises an electrically insulating material such as a ceramic, polymer and/or plastic, the bus bars 45b do not need to be physically separated from the back pan 25.

Referring now to FIGS. 1, 2A, 2B, 2C, 2E, 2F, 4A and 4B, the backpan assembly 50 can comprise a plurality of longitudinally spaced apart latches 60. The latches 60 engage lances 20 in the back wall 12 of the enclosure 10. The term "lance" is used herein to refer to a feature and/or member that faces and engages a corresponding latch 60 to lock the latch 60 of the backpan assembly 50 to the back wall 12 of the enclosure 10.

Figure 2A:
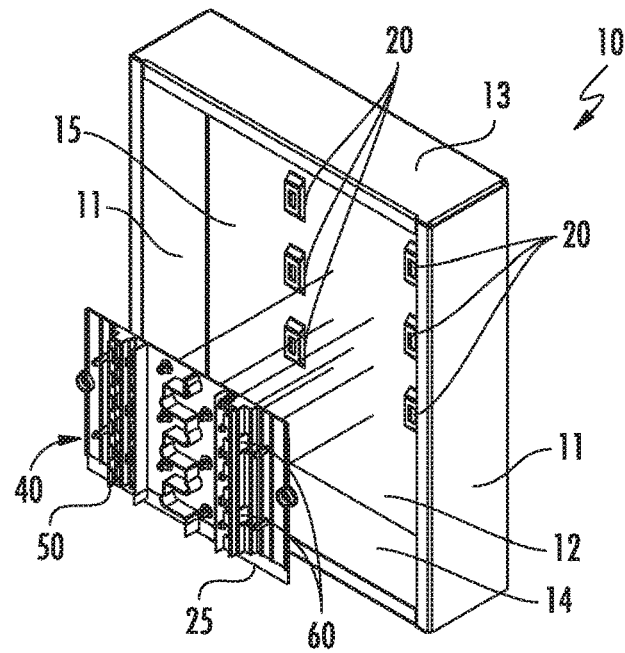
FIG. 2A is a side, front perspective view of the loadcenter shown in FIG. 1 with the backpan assembly aligned for fastening to the backwall of the enclosure according to embodiments of the present invention.

As shown in FIG. 2A, the backpan assembly 50 can be aligned with the enclosure 10 and a locking engagement can be carried out with a single inward pressing action to concurrently lock the latches 60 to the corresponding lances 20 which fastens the backpan assembly 50 to the backwall 12 in its final assembly position.

As shown in FIGS. 2C, 2D, 4A, 4B, 5-8, 9 and 10, the lances 20 can project inwardly and can be provided as a plurality of longitudinally spaced apart lances 20. The lances 20 can be provided as a set of longitudinally aligned right side lances and a set of longitudinally aligned left side lances. Pairs of right and left side lances 20 may also be horizontally aligned. The lances 20 can include apertures 21 that face inward and extend through the projecting portion 20p of the lances 20.

The latches 60 can be provided as a set of longitudinally aligned right side latches and a set of longitudinally aligned left side latches. Pairs of right and left side latches 60 may also be horizontally aligned.

Figure 9:
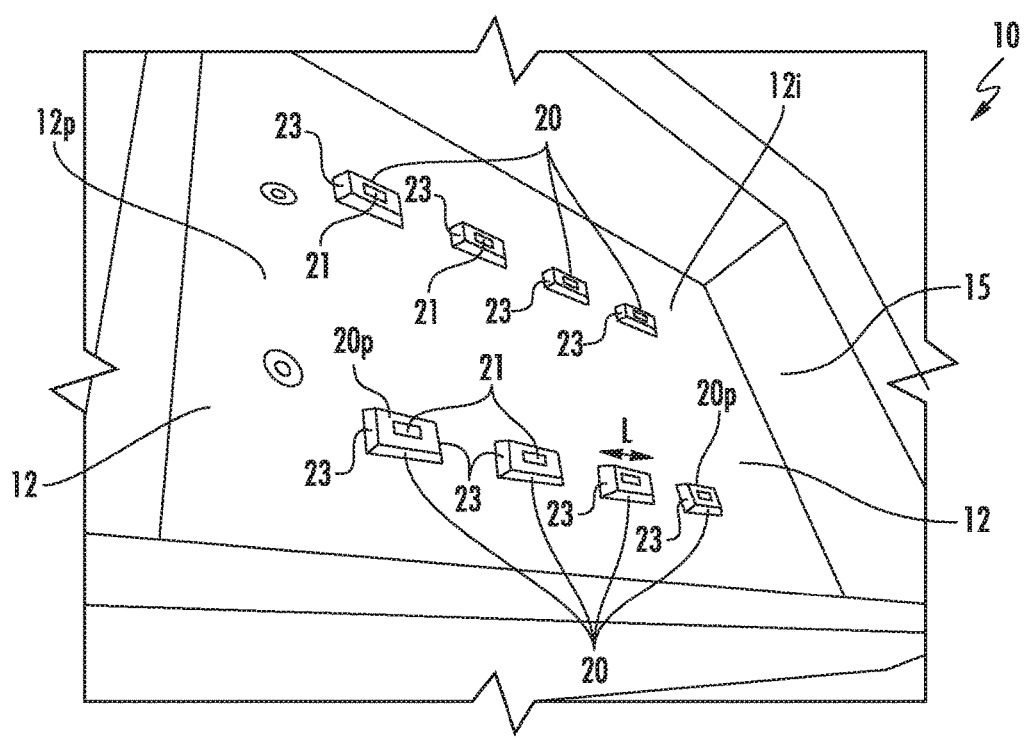
FIG. 9 is a top side perspective view of the enclosure shown in FIG. 1, but shown without the backpan assembly.
Figure 11:
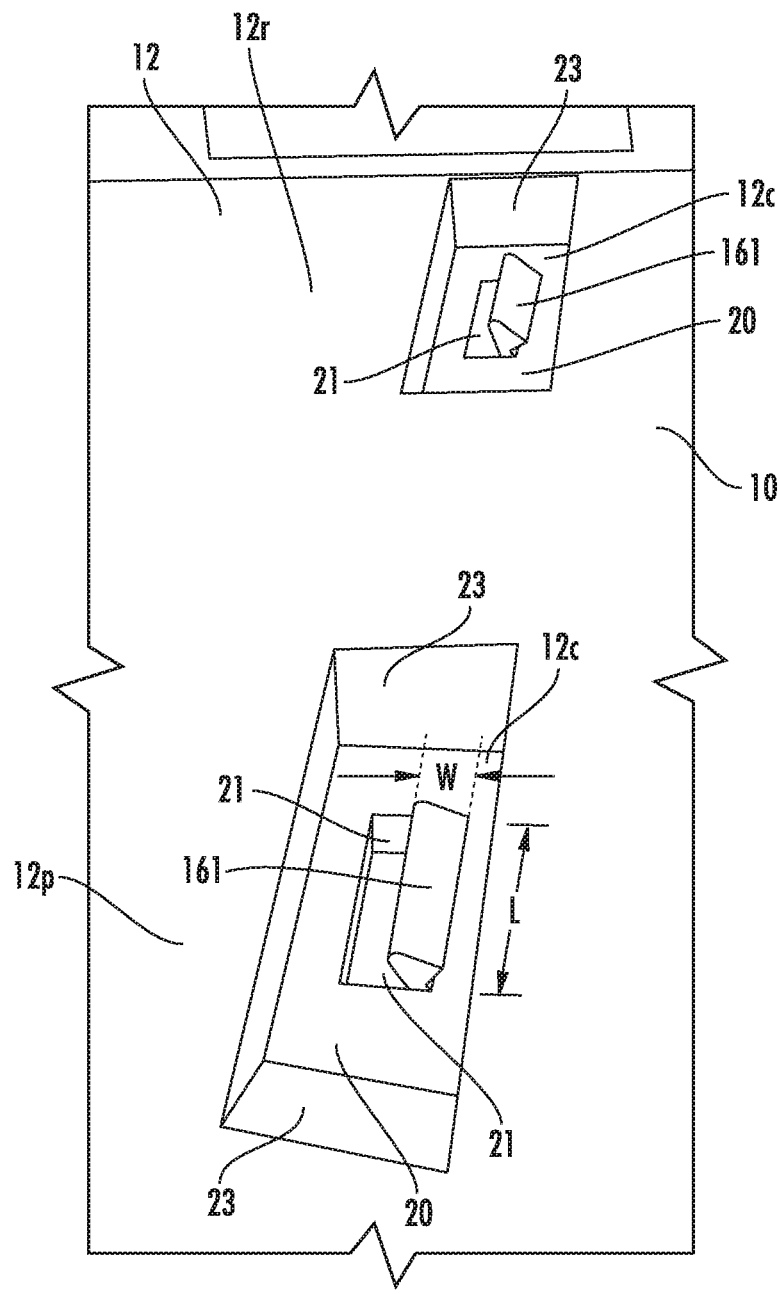
FIG. 11 is a partial rear perspective view of the enclosure with the assembled back pan assembly shown in FIG. 1 according to embodiments of the present invention.

Referring to FIG. 2, FIG. 9 and FIG. 11, the apertures 21 of the lances 20 can be rectangular with a long dimension L corresponding to a longitudinal dimension of the enclosure 10 and with the long dimension L greater than a width dimension W. In some particular embodiments, the long dimension can be in a range of 0.5 inches to 2 inches, typically between about 0.5 inches and 1 inch, more typically about 0.625 inches. The shorter dimension, i.e., a width W dimension, can be about half the long dimension L. The width W can be, for example, in a range of about 0.25 inches to about 0.5 inches, typically about 0.31 inches.

Figure 3A:
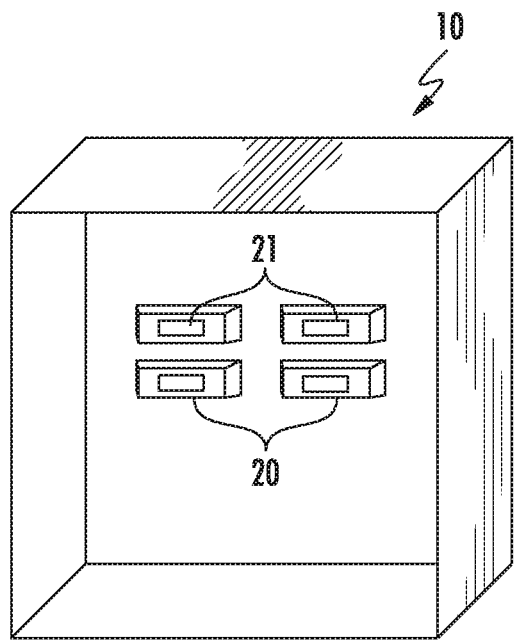
FIG. 3A and FIG. 3B are front perspective view of alternate embodiments or lance orientations of the enclosure according to embodiments of the present invention.
Figure 3B:
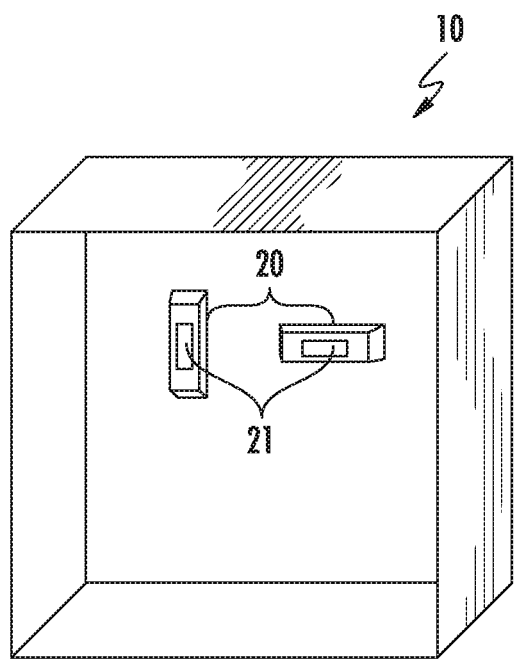

As shown in FIGS. 3A and 3B, the lances 20 and respective apertures 21 that receive the latches 60 can be oriented horizontally instead of vertically or combinations of vertical and horizontal lances as shown in FIG. 3B. The legs 160 and lips 161 of the latches 60 can be oriented in a corresponding direction.

The lip 161 of the leg 160 of the latch 60 can have a smaller length and width than a corresponding aperture 21, and is typically between 75%-95% of the length L of the aperture 21. In some particular embodiments, the lip 161 has a longitudinal length L of between 0.5 inches and 1 inch, such as, for example, about 0.59 inches and a width W that is less than the length L (FIG. 11), typically between about 0.5 and 0.3× the width W.

Figure 2B:
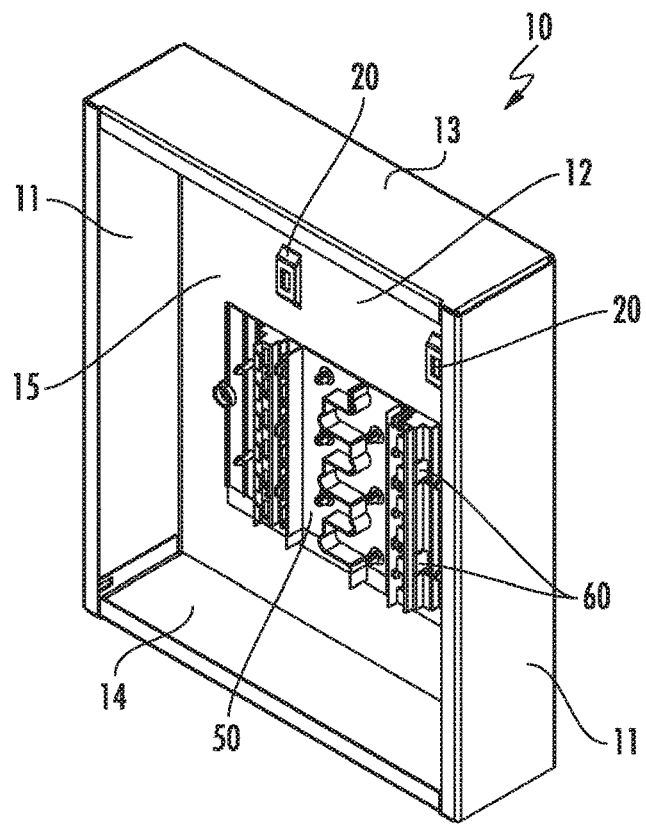
FIG. 2B is a top, side perspective view of the back pan assembly assembled to the backwall of the enclosure according to embodiments of the present invention.
Figure 2C:
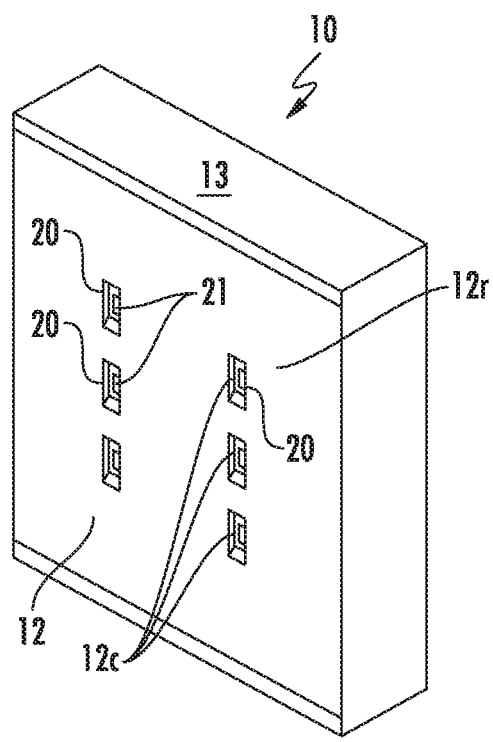
FIG. 2C is a top, rear perspective view of the loadcenter shown in FIG. 1 according to embodiments of the present invention.
Figure 2D:
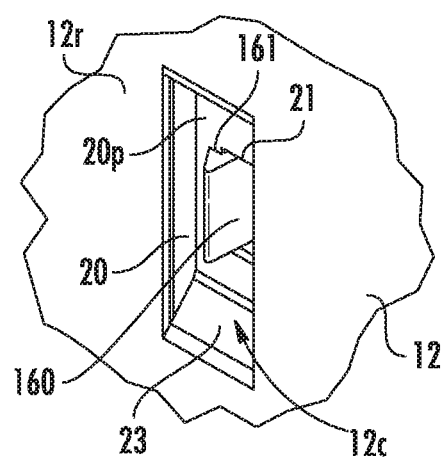
FIG. 2D is an enlarged partial rear view of a portion of the rear of the loadcenter shown in FIG. 2C.

Referring to FIGS. 2C, 2D and 11, the back wall 12 of the enclosure 10 can have a rear and/or externally facing surface 12r with cavities 12c (i.e., inward indentations or recesses) corresponding to the projection surfaces 20p of the lances 20. The apertures 21 can extend through the back wall 12. The cavities 12c can have a rectangular perimeter extending about the apertures 21. In some embodiments, the back wall 12 can comprise a monolithic single piece of sheet metal member that can be formed to provide inward integral indentations or recesses to provide the lance peaks. In some embodiments, the projections 20p of the lances 20 can be welded or brazed onto the back panel 12.

Figure 4A:
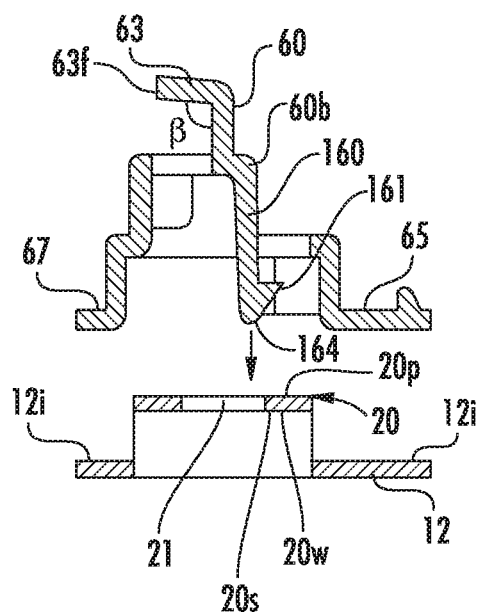
FIG. 4A is a section view taken along line 4A-4A of FIG. 7 of a backpan assembly latch aligned with a case lance according to embodiments of the present invention.
Figure 4B:
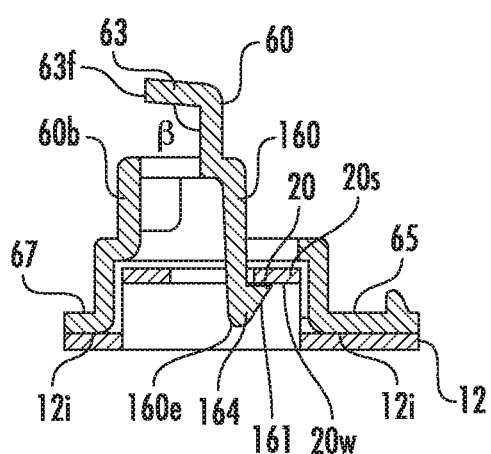
FIG. 4B is a section view taken along line 4B-4B of FIG. 5 showing the backpan assembly latch attached to the case lance according to embodiments of the present invention.
Figure 5:
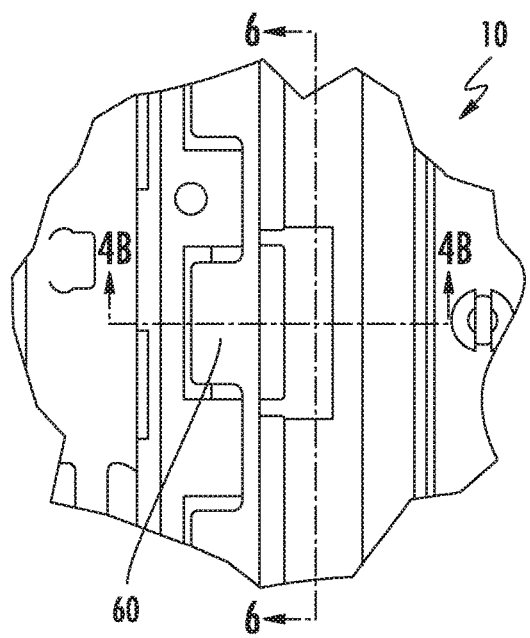
FIG. 5 is an enlarged partial front view of the enclosure and backpan assembly shown in FIG. 1 illustrating a region of one of the latch and case lance positions according to embodiments of the present invention.

Referring to FIGS. 4A, 4B and 11, the latches 60 can include a leg 160 that extends toward the back wall 12, aligned with a respective lance 20 (shown as a downwardly extending leg in the orientation shown). The leg 160 can be perpendicular to the back wall 12. The leg 160 can have an end portion with a lip 161. The lip 161 can be perpendicular to the leg 160. The lip 161 can be parallel to the back wall 12 and/or wall 20w of the projecting portion 20p of the lance 20.

Referring to FIGS. 4A, 4B, and 5-8, the leg 160 can extend through an aligned lance aperture 21 and position the lip 161 under and against a surface 20s of the wall 20w of the lance 20. The lip 161 can be elongate and extend longitudinally a distance between 0.25 inches and 2 inches, more typically between about 0.5 inches and 0.6 inches and laterally to a lesser extent.

Figure 8:
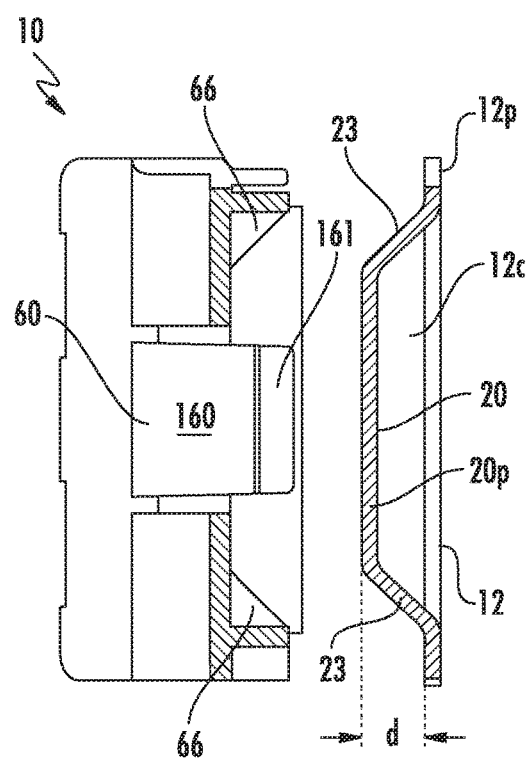
FIG. 8 is a section view taken along line 8-8 of FIG. 7 illustrating the latch aligned with a corresponding lance according to embodiments of the present invention.

Referring to FIG. 8, the projection of the lance 20p can extend a distance "d" forward of a planar rear facing primary surface 12p of the back wall 12. This distance "d" can be between 0.1 inches and 2 inches, such as between 0.1 inches and 1 inch, in some embodiments.

Referring to FIG. 4B, the lip 161 can engage a surface 20s of the lance wall 20w. In some embodiments, the lip 161 has a lateral engagement extent with the lance wall 20w of between about 0.05 inches to about 0.25 inches, more typically in a range of 0.06 inches to 0.1 inches, such as about 0.06 inches, about 0.065 inches, and about 0.07 inches, in some particular embodiments. Different latches 60 may have different lateral engagement extents with a respective lance 20.

As shown in FIGS. 2D, 4B, 11, 12A and 12B, the lip 161 can reside closer to one side of the aperture 21 than another and engage i.e., abut, a single long side of the projecting portion 20p of the lance 20.

Figure 2E:
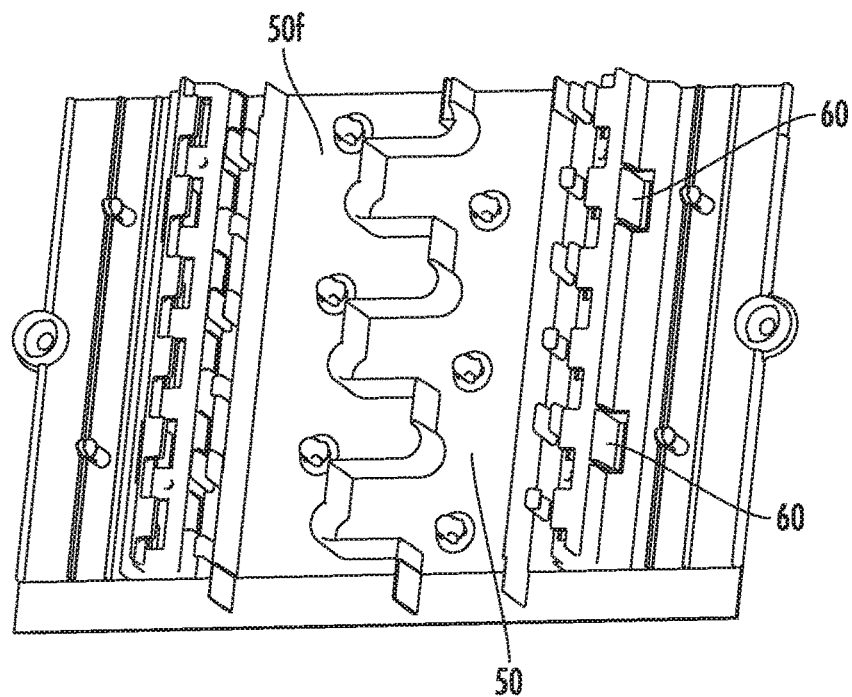
FIG. 2E is a front perspective view of a backpan assembly according to embodiments of the present invention.
Figure 2F:
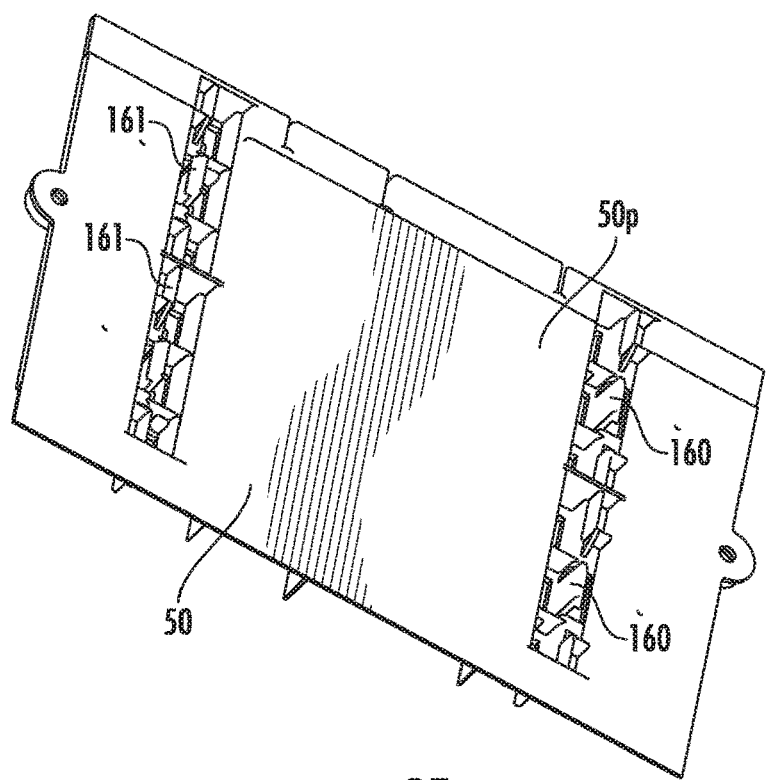
FIG. 2F is a back perspective view of the backpan assembly shown in FIG. 2E according to embodiments of the present invention.

FIGS. 2E and 2F show an exemplary backpan assembly 50 with the latches 60 and associated legs 160 and lips 161.

The backpan assembly 50 can comprise a planar substrate 50p that holds the latches 60 with the legs oriented to face the lances 20 (FIG. 2C, for example).

FIG. 9 and FIG. 11 show that the lances 20 can have projections 20p with a rectangular shape and with upper and lower end portions 23 that taper toward a primary inner surface 12i of the back wall 12. The projections 20p of the lances can have closed surfaces except for the aperture 21.

Referring again to FIGS. 4A, 4B, 12A and 12B, the latch 60 can include an outer facing longitudinally extending portion 63 that has an angular offset p of about 60-120 degrees with a free end 63f that extends above the leg 160. The outer facing portion 63 can include at least one longitudinally extending recess 63r, shown in FIG. 12A as first and second longitudinally extending recesses 63r, one above and one below the leg 161.

Referring to FIG. 10, in some embodiments, a foot of a breaker 35f can engage and/or reside over the outer end portion 63 of one or more respective latches 60 to hold a breaker 35 in position.

The latch 60 can also include a body 60b with first and second members 65, 67, respectively, that reside on laterally and longitudinally opposing sides of the leg 160. The members 65, 67 can have planar free ends 65f, 67f that are parallel to the inner surface 12i of the back wall to reside against the inner surface 12i of the back wall 12 at locations that are planar with the primary surface 12p of the back wall 12, adjacent but spaced apart from the projections 20p and cavities 20c of the lance 20. Stated differently, the body 60b of the latch 60 can extend in four directions about the respective lance 20, to both lateral sides and above and below a respective leg 160 and adjacent the lance 20.

Referring to FIGS. 4A and 4B, the leg 160 can have a tapered surface 164 from a lower end 160e to the lip 161. Thus, the tapered surface 164 forces the leg 160 to flex outward as it contacts the wall 20w of the lance 20 but the leg 161 can then flex back into its original shape (FIG. 4A) once but the leg 161 extends through the lance aperture 21 to position the lip 161 under the wall 20w of the lance 20.

The latches 60 and lances 20 can be easily assembled together via a single, straight inward push motion to concurrently lock the different latches and lances together with a single direction motion.

Figure 6:
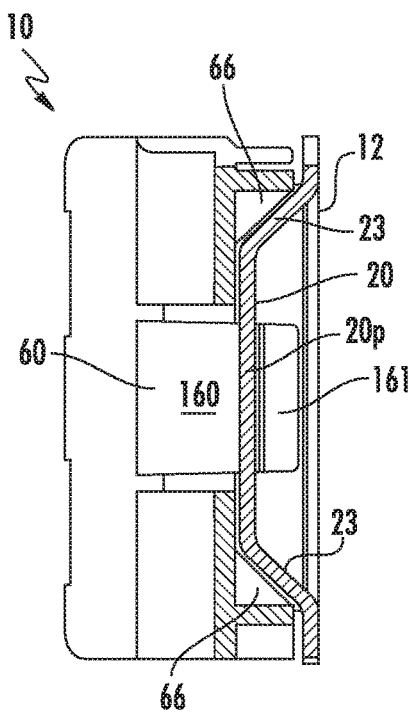
FIG. 6 is a section view taken along line 6-6 of FIG. 5 illustrating the latch attached to an aligned lance according to embodiments of the present invention.
Figure 7:
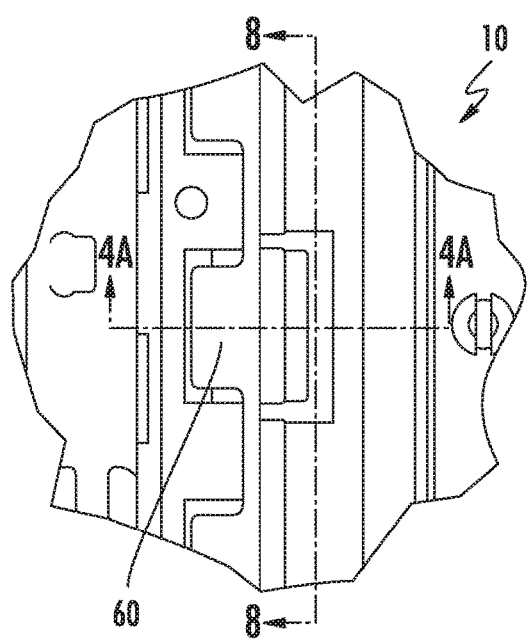
FIG. 7 is an enlarged partial front view of the enclosure and backpan assembly shown in FIG. 1 illustrating a region of one of the latch and case lance positions, aligned but prior to attachment according to embodiments of the present invention.

As shown in FIG. 6 and FIG. 8, for example, the latches 60 can include longitudinally extending upper and lower angled ribs 66 that can contact a corresponding lance projection tapered upper and lower end wall 23 during assembly. The ribs 66 and endwalls 23 can cooperate to slidingly guide the latch 60 and lance 20 into a proper orientation/position for engagement. The angled ribs 66 can have an angle, measured from horizontal, that is between 30-60 degrees, typically about 45 degrees. The tapered end walls 23 of the lance projection 20p can have a corresponding angle.

As shown in FIGS. 1, 2A, 2B, four sets of latch and lance pairs 20, 60 are used to fasten the backpan assembly 50 to the back wall 12 of the enclosure 10. However, a single pair or a plurality of pairs (and more or less pairs than shown) may be used. Also, where right and left side pairs are used, different numbers of pairs may be used on different sides, i.e., one pair on the right and two pairs on the left. The latches 60 and lances 20 may have different sizes or configurations at different longitudinal or lateral locations and different orientations (horizontal or horizontal and vertical as discussed with respect to FIG. 3A and FIG. 3B) or for different loadcenters.

In some embodiments, a single set of longitudinally spaced apart latches 60 and lances 20 may be used and the single set may not be aligned in a column but can be offset relative to each other at different lateral positions (not shown).

In some embodiments, the latches 60 (and lances 20) are not required to be aligned longitudinally and may not be aligned laterally/horizontally where right and left side latches 60 and lances 20 are used.

There may be a greater number of lances 20 than latches 60 leaving some lances unused (FIG. 1, FIG. 3, for example). This allows for adjustability for assembly to position different backpan assemblies 50 at different locations in a respective enclosure or to use a common enclosure for different backpan assemblies.

FIG. 10 illustrates that a primary circuit breaker 35 can be positioned over some lances 20.

FIG. 13 illustrates a loadcenter 200 with a front panel 125 and door 130 that cooperate with the enclosure 10. The loadcenters 200 can be residential or industrial loadcenters. The loadcenter 200 can include a main circuit breaker 35 (FIG. 10) and it can be an Arc Fault Circuit Interrupter (AFCI) and/or Ground Fault Circuit Interrupter (GFCI) which are among a variety of overcurrent protection devices used for circuit protection and isolation. AFCIs reduce fire hazards in electrical circuits by reducing the effects of high current arcing faults as well as detecting persistent low-current arcing faults. GFCIs reduce the potential of electrical shock. Both branch feeder and combination AFCIs provide conventional thermal and magnetic overcurrent protection. Both can also provide high current or "parallel" arcing fault detection and fire mitigation for installed wiring and connected cords. National Electrical Code (NEC) revisions have increased the requirement for sections of the home that require Arc Fault or Ground Fault protection. The circuit breaker can be a Type BR or CH AFCI or GFCI breaker.

Figure 14:
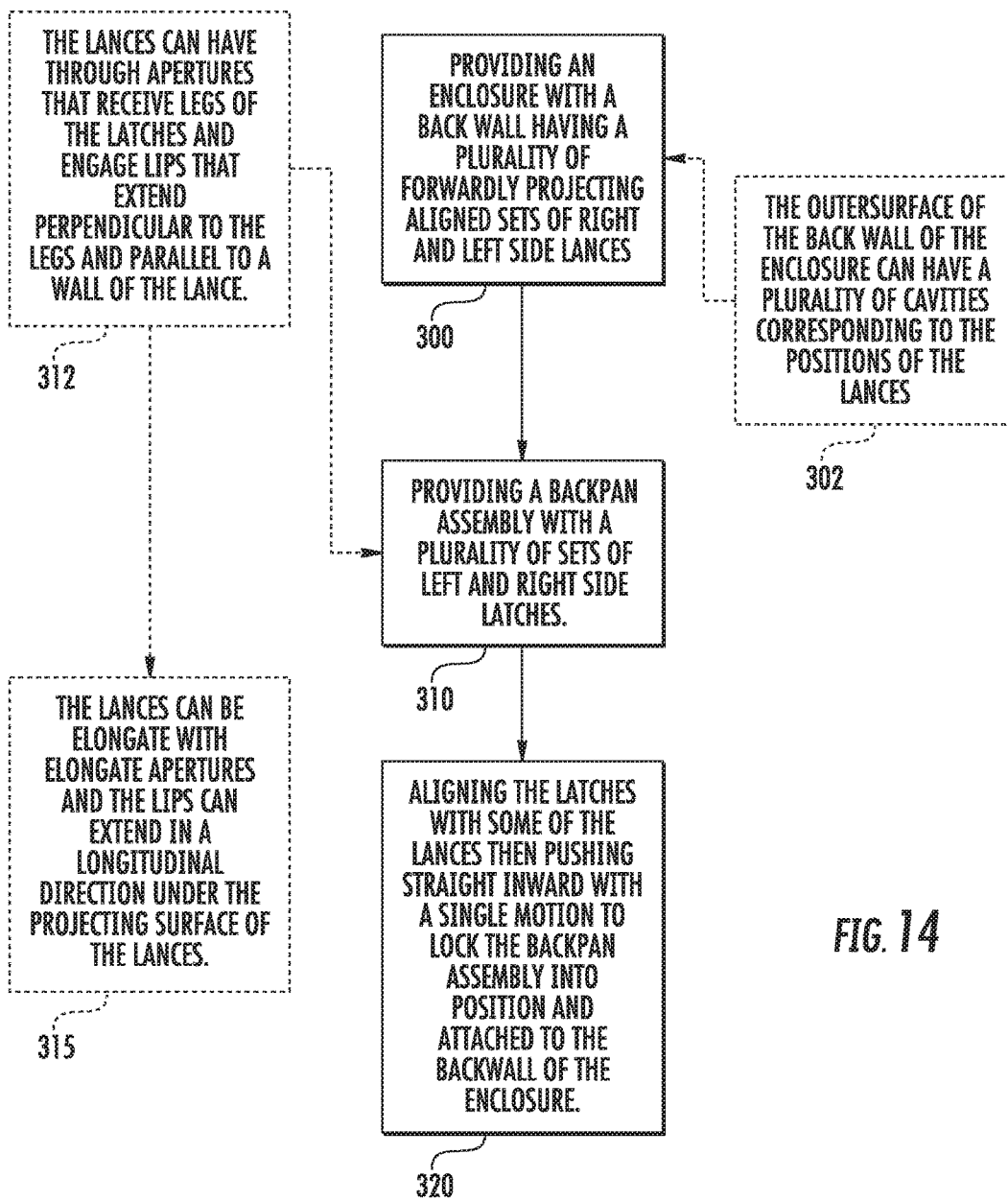
FIG. 14 is flow chart of exemplary assembly operations that can be used to mount a backpan assembly to an enclosure according to embodiments of the present invention.

FIG. 14 illustrates a single motion assembly method according to embodiments of the present invention. An enclosure with a back wall having a plurality of forwardly projecting aligned sets of right and left side lances is provided (block 300). A backpan assembly with a plurality of sets of left and right side latches is also provided (block 310). The latches are aligned with lances and the backpan assembly is then pushed straight inward with a single motion to lock the backpan assembly into position and attached to the backwall of the enclosure (block 320).

The outer surface of the back wall of the enclosure can have a plurality of cavities corresponding to the positions of the lances (block 302).

The lances have through apertures that receive legs of the latches and engage lips that extend perpendicular to the legs and parallel to a wall of the lance (block 312).

The lances can be elongate with elongate apertures and the lips can extend in a longitudinal direction under the projecting surface of the lances (block 315).

Figure 15A:
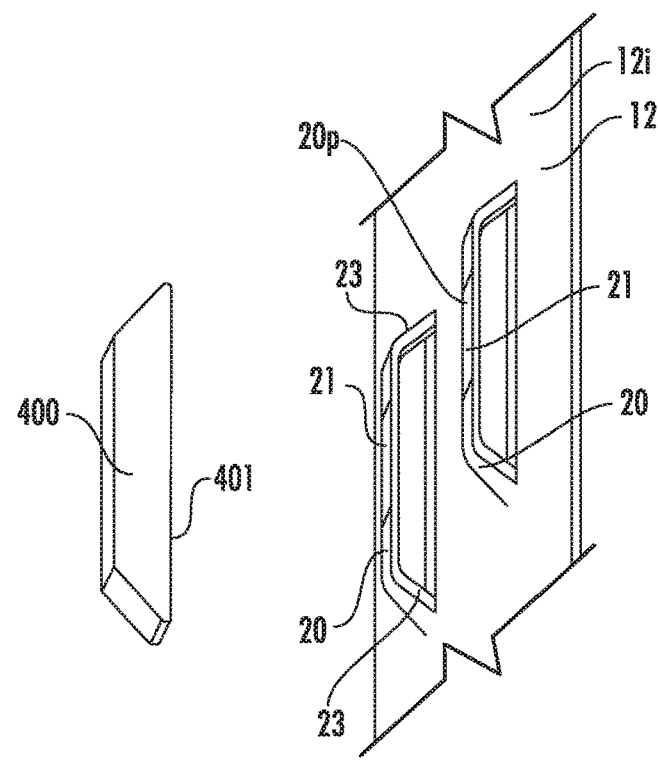
FIG. 15A is a partial side exploded view of an internal cover for a lance projection of an enclosure according to embodiments of the present invention.
Figure 15B:
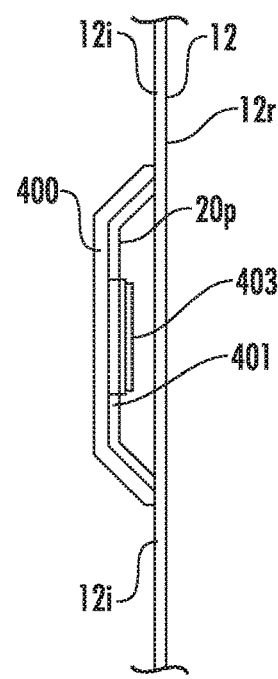
FIG. 15B is a section assembled view of the cover and back wall of the enclosure shown in FIG. 15A.

FIG. 15A and FIG. 15B illustrate an internal cover 400 that can be placed over respective unused lances 20 according to some embodiments of the present invention. The cover 400 can have a three-dimensional shape with a cavity 401 that can slidably receive the lance projection 20p. The cavity 401 can be rectangular. The cover 400 can have an internal member 403 that projects outward toward the back wall 12 and can extend through the aperture 21 of the lance projection 20p. In some embodiments, the cover 400 can comprise or be polymeric or elastomeric.

Figure 16A:
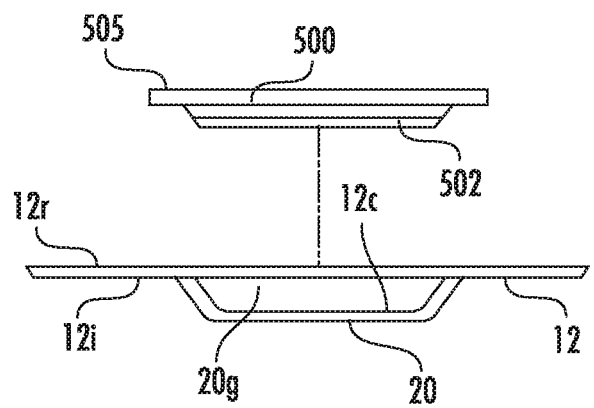
FIG. 16A is a partial exploded view of an external cover for a lance of an enclosure according to embodiments of the present invention.
Figure 16B:
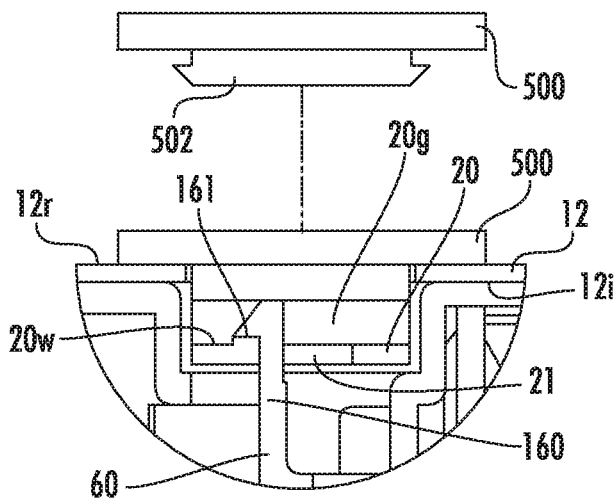
FIG. 16B is an enlarged partial section view of the cover and back wall shown in FIG. 16A with a cover shown aligned prior to assembly and further comprising a latch engaging the lance with the cover in position according to embodiments of the present invention.
Figure 16C:
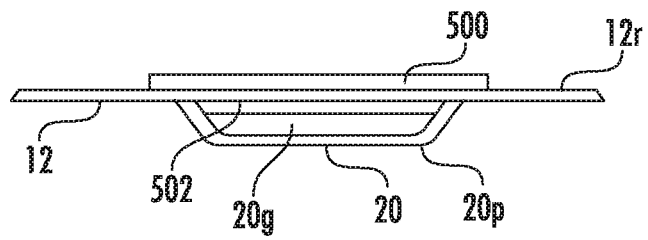
FIG. 16C is a section assembled view of the cover and back wall of the enclosure shown in FIG. 16A.

FIG. 16A-16C illustrate an external lance cover 500 that can be placed inside lance cavities 12c on the rear 12r of the back wall 12 of the enclosure 10. The external lance cover 500 can be used with lances 20 that engage latches 60. The cover 500 can have an inner portion 502 that resides behind (under in the orientation shown) a leg 161 of the latch 60. The cover 500 can partially plug the cavity 12c, leaving an open space 20g for the leg 161 of the latch (FIG. 16B). FIG. 16A and FIG. 16C illustrate that the cover 500 can be placed on the back wall 12 prior to the backpan assembly 50 with the latches 60 being attached to the back wall 12. The outer surface 505 of the cover 500 can be planar and extend across the cavity 12c. In other embodiments, the cover 500 has a three dimensional inwardly extending shape that corresponds to the shape of the cavity 12c. In some embodiments, the cover 500 can comprise or be polymeric or elastomeric.

Figure 17A:
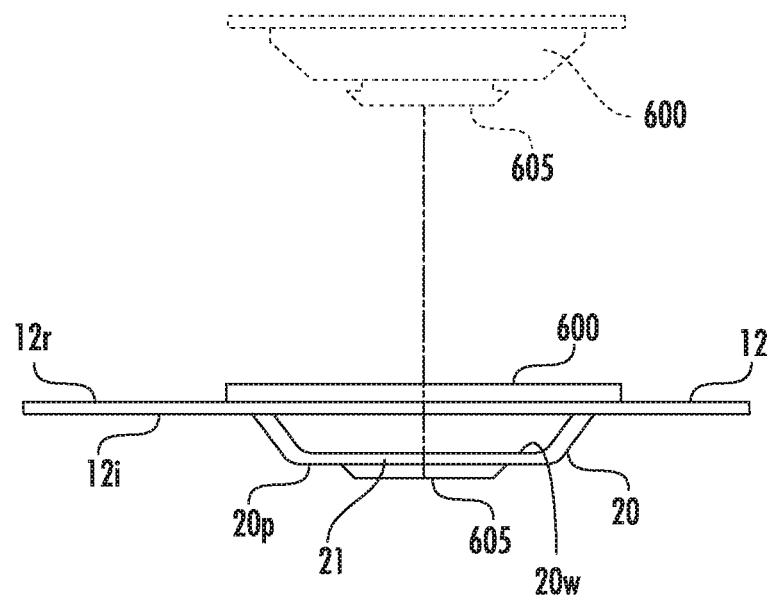
FIG. 17A is a partial exploded view of another external cover for a lance of an enclosure according to embodiments of the present invention.
Figure 17B:
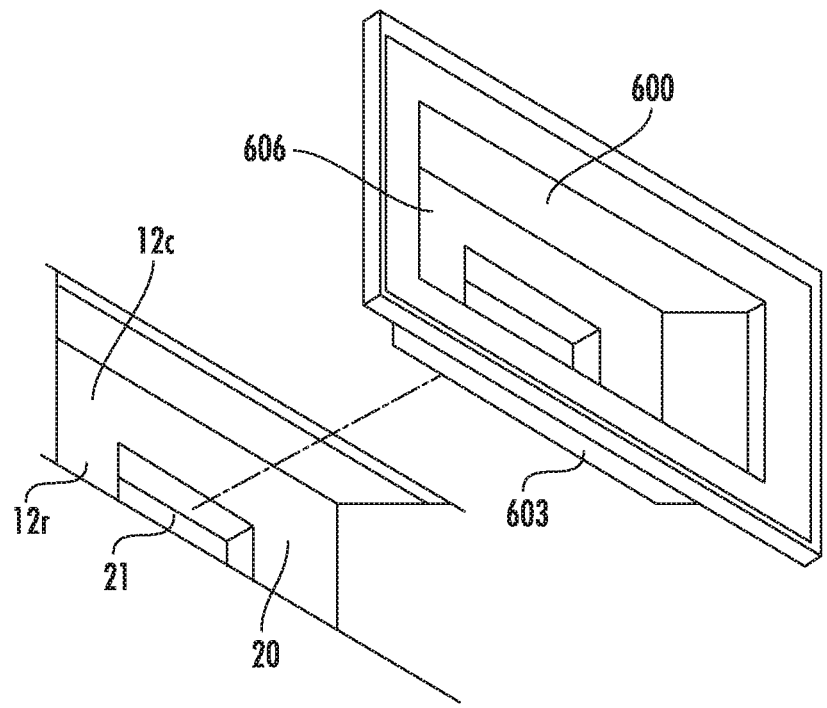
FIG. 17B is a section assembled view of the cover and back wall of the enclosure shown in FIG. 17A and also shows the cover in exploded view.

FIGS. 17A and 17B illustrate an external lance cover 600 that can be placed inside lance cavities 12c on the rear 12r of the back wall 12 of the enclosure 10. The external lance cover 600 can be used with lances 20 that are unused (do not engage latches 60). The external cover 600 can have an inwardly extending body 603 with a front segment 605 that extends through the lance aperture 21. The cover 600 can have a cavity 606 that corresponds to a shape of the rear wall cavity 12c. The cover 600 can have a rectangular perimeter and can have a rectangular cavity 606. The front segment 605 can have a rectangular perimeter that is smaller than that of the body 603. In some embodiments, the cover 600 can comprise or be polymeric or elastomeric.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed is:

1. A loadcenter comprising:
   an enclosure having an interior compartment and a back wall, wherein the back wall comprises at least one lance that projects inwardly toward a front of the enclosure, wherein the at least one lance comprises an aperture; and
   a back pan assembly in the interior compartment, wherein the back pan assembly comprises at least one latch, the at least one latch comprises a rearwardly extending leg, wherein, the leg extends through the aperture of an aligned one of the at least one lance to attach the back pan assembly to the back wall.

2. The loadcenter of claim 1, wherein the at least one lance is a plurality of longitudinally and/or laterally spaced apart lances, and wherein the at least one latch is a plurality of longitudinally and/or laterally spaced apart latches.

3. The loadcenter of claim 2, wherein the plurality of spaced apart latches comprises a first plurality of latches longitudinally aligned on a rear of a right side of the back pan assembly and a second plurality of latches longitudinally aligned on a rear of a left side of the back pan assembly, and wherein pairs of the first plurality and the second plurality of latches are laterally aligned.

4. The loadcenter of claim 1, wherein the at least one lance is a plurality of spaced apart lances, and wherein the back wall comprises a rear outer facing surface with an inwardly extending cavity behind each lance.

5. The loadcenter of claim 1, wherein each of the at least one lance comprises a rectangular inner facing projection with the aperture and which resides centered about a cavity in the back wall, and wherein the inner facing projection with the aperture comprises longitudinally spaced apart upper and lower end portions that taper in a longitudinal direction toward an inner surface of the back wall.

6. The loadcenter of claim 1, wherein the aperture is rectangular and resides on an inner most surface of the back wall in front of the cavity.

7. The loadcenter of claim 1,
   A loadcenter comprising:
   an enclosure having an interior compartment and a back wall, wherein the back wall comprises at least one lance that projects inwardly toward a front of the enclosure, wherein the at least one lance comprises an aperture; and
   a back pan assembly in the interior compartment, wherein the back pan assembly comprises at least one latch, the at least one latch comprises a rearwardly extending leg, wherein the leg extends through an aligned lance of the at least one lance to attach the back pan assembly to the back wall,
   wherein the aperture is elongate and extends in a lateral or longitudinal direction, wherein the leg comprises an elongate lip, and wherein the elongate lip extends through the aligned lance and engages a wall about one side the aperture.

8. A loadcenter comprising:
   an enclosure having an interior compartment and a back wall, wherein the back wall comprises at least one lance that projects inwardly toward a front of the enclosure, wherein the at least one lance comprises an aperture; and
   a back pan assembly in the interior compartment, wherein the back pan assembly comprises at least one latch, the at least one latch comprises a rearwardly extending leg, wherein the leg extends through an aligned lance of the at least one lance to attach the back pan assembly to the back wall,
   wherein the leg of the latch comprises an elongate lip that engages a wall of the aligned one of the lances on one side of the aperture, and wherein the at least one latch further comprises a latch body with first and second segments that extend laterally and longitudinally about the leg and reside against an inner surface of the back wall at locations adjacent but spaced apart from the at least one lance.

9. A loadcenter comprising:
   an enclosure having an interior compartment and a back wall, wherein the back wall comprises at least one lance that projects inwardly toward a front of the enclosure, wherein the at least one lance comprises an aperture; and
   a back pan assembly in the interior compartment, wherein the back pan assembly comprises at least one latch, the at least one latch comprises a rearwardly extending leg, wherein the leg extends through an aligned lance of the at least one lance to attach the back pan assembly to the back wall,
   wherein the at least one latch further comprises upper and lower longitudinally spaced apart angled ribs that slidingly receive longitudinally or laterally tapered spaced apart inwardly facing ends of the at least one lance to help guide a cooperating latch and lance into proper position for locking engagement.

10. A loadcenter comprising:
an enclosure having an interior compartment and a back wall, wherein the back wall comprises at least one lance that projects inwardly toward a front of the enclosure, wherein the at least one lance comprises an aperture; and
a back pan assembly in the interior compartment, wherein the back pan assembly comprises at least one latch, the at least one latch comprises a rearwardly extending leg, wherein, the leg extends through an aligned lance of the at least one lance to attach the back pan assembly to the back wall,
wherein an innermost wall segment of the at least one lance comprises the aperture and resides a distance in front of a primary surface of the back wall a distance that is between 0.1 inches and 1 inch, wherein the enclosure and the at least one lance are metallic, and wherein the at least one latch is electrically non-conductive or less conductive than the enclosure or the at least one lance.

11. A metallic enclosure for an electrical apparatus comprising a back wall with a plurality of lance projections that face inward, the projections comprising respective innermost wall segments with apertures extending therethrough, wherein a rear outer facing surface of the back wall comprises inwardly extending cavities behind the lance projections.

12. The enclosure of claim 11, wherein the plurality of spaced apart lances comprises at least three lances on a right side of the back wall and at least three on a left side of the back wall.

13. The enclosure of claim 11, wherein the plurality of spaced apart lances comprises a first plurality of lances longitudinally aligned on a right side of the enclosure and a second plurality of lances longitudinally aligned on a left side of the enclosure, and wherein pairs of the first plurality and the second plurality of lances are laterally aligned.

14. The enclosure of claim 11, wherein the lances comprise a rectangular inner facing projection shape with longitudinally spaced apart upper and lower end portions that taper in a longitudinal direction toward an inner surface of the back wall.

15. The enclosure of claim 11, wherein the apertures are rectangular.

16. The enclosure of claim 11, wherein the apertures are elongate and extend in a longitudinal or lateral direction, and wherein a length dimension of the apertures is between 0.5 inches and 1 inch.

17. The enclosure of claim 11, wherein the enclosure and lances are metallic.

18. The enclosure of claim 11, wherein an innermost wall of the lance projections positions the lance apertures a distance in front of a primary surface of the back wall a distance that is between 0.1 inches and 1 inch.

19. The enclosure of claim 11, wherein the enclosure is a loadcenter.

20. A method of installing a backpan assembly to a back wall of an enclosure, comprising:
providing an enclosure with a back wall having a plurality of forwardly projecting lances, with a plurality of the lances on a right side of the back wall and a plurality of the lances on a left side of the back wall;
providing a backpan assembly with a plurality of latches;
aligning the latches with the lances; and
then pushing the backpan assembly straight inward with a single motion to lock the backpan assembly into position with the latches concurrently extending though respective apertures in the lances, coupled to the lances and thereby attached to the backwall of the enclosure.

21. The method of claim 20, wherein an outer surface of the back wall of the enclosure comprises cavities corresponding to the positions of the lances, and wherein:
(a) the lances have through apertures that receive legs of the latches and engage lips that extend perpendicular to the legs and parallel to a wall of the lance; and/or
(b) the lances are elongate with elongate apertures and the lips extend in a longitudinal and/or a lateral direction under a projecting surface of the lances.

* * * * *

UNITED STATES PATENT AND TRADEMARK OFFICE
CERTIFICATE OF CORRECTION

PATENT NO. : 10,141,723 B2  
APPLICATION NO. : 15/467870  
DATED : November 27, 2018  
INVENTOR(S) : Tony Ray Benson Page 1 of 1

It is certified that error appears in the above-identified patent and that said Letters Patent is hereby corrected as shown below:

In the Claims

Column 12, Line 13, Line 1 of Claim 7:
Please delete the phrase "The loadcenter of claim 1,"

Signed and Sealed this
Twelfth Day of March, 2019

Andrei Iancu
*Director of the United States Patent and Trademark Office*